Nov. 19, 1968   C. V. FOGELBERG ET AL   3,412,187
METHOD FOR FORMING PLASTIC ARTICLES
Original Filed Dec. 4, 1962   3 Sheets-Sheet 1
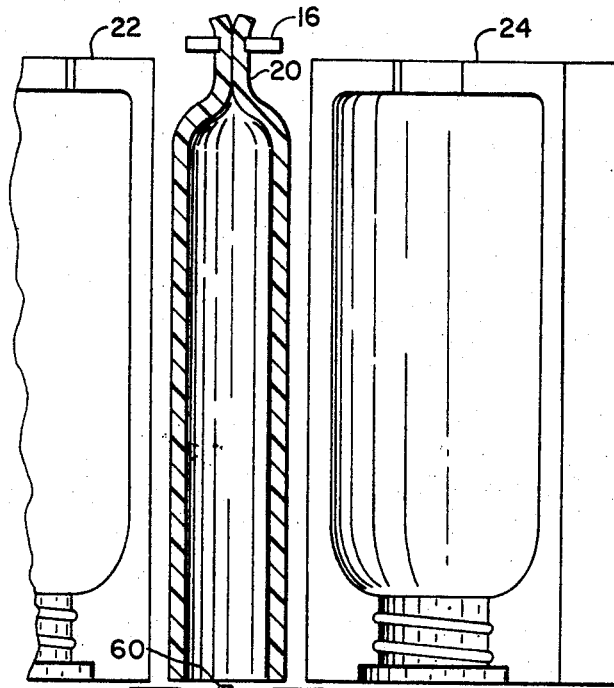
FIG. 3
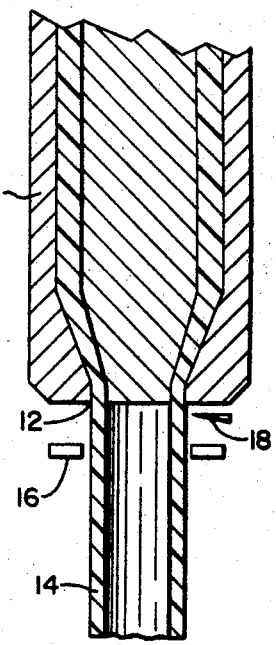
FIG. 1
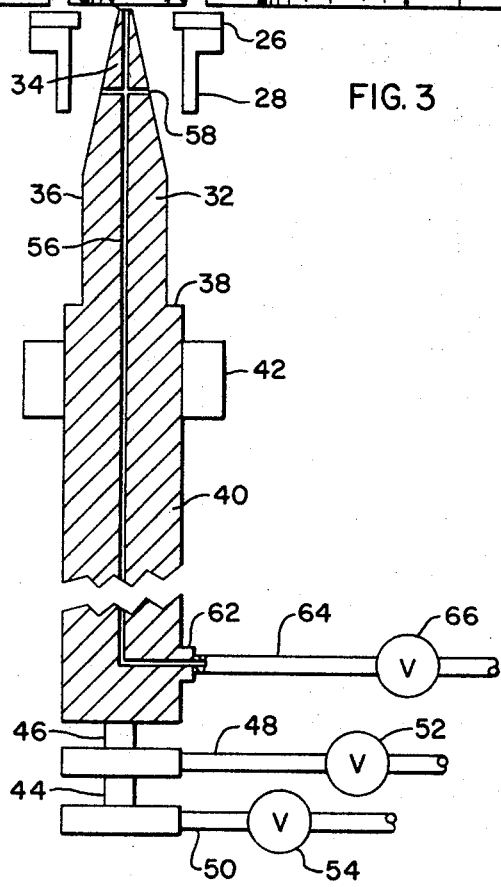
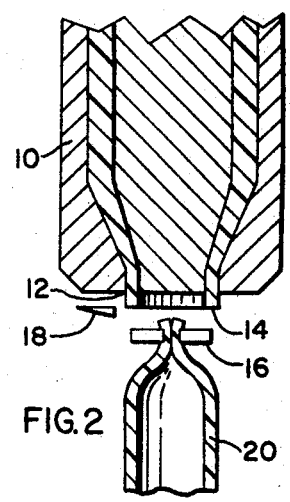
FIG. 2
INVENTORS
CLEMENT V. FOGELBERG
RICHARD H. CRAWFORD
DONALD E. OBERBECK
BY *R. P. Campbell*
ATTORNEY

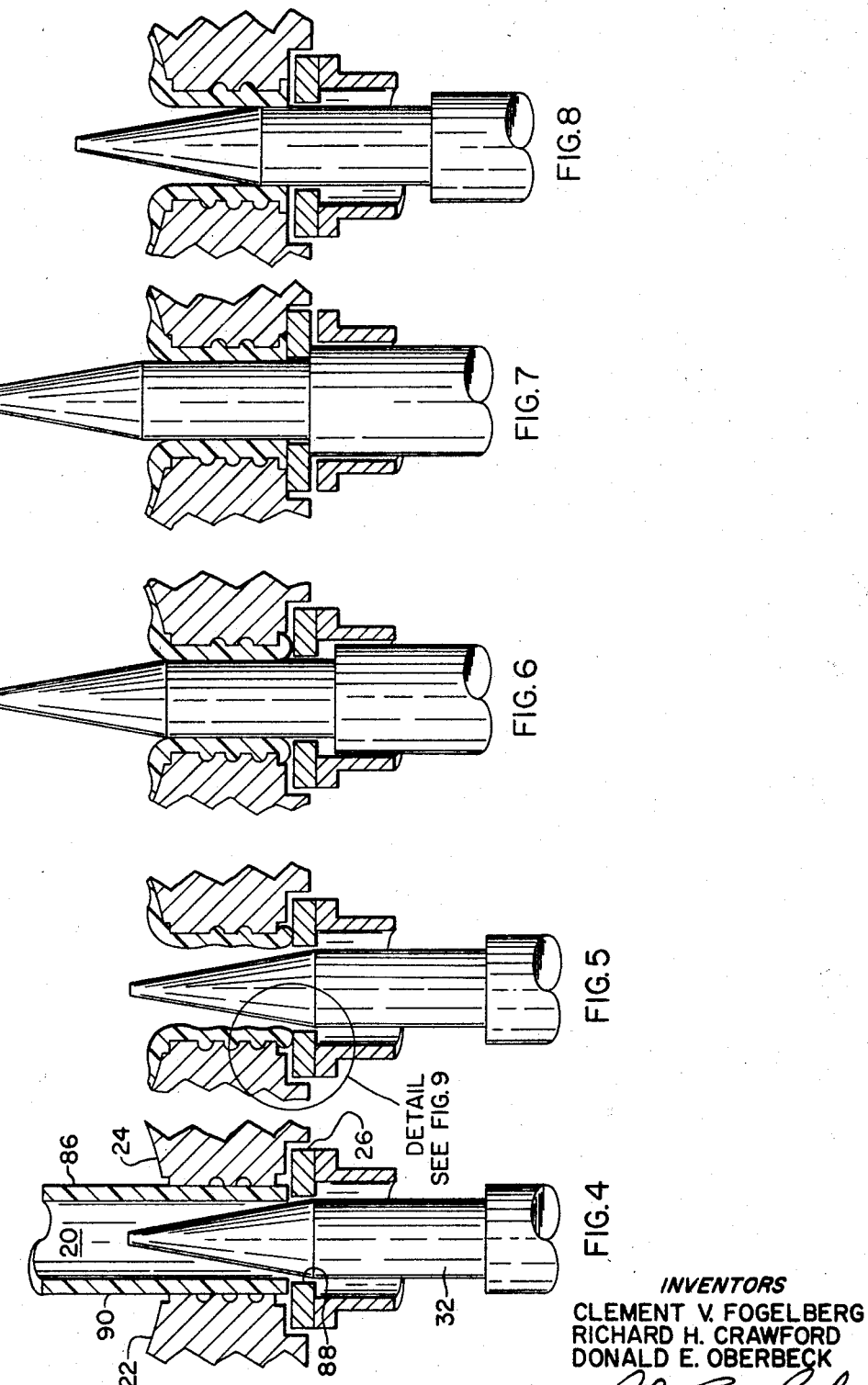

Nov. 19, 1968  C. V. FOGELBERG ET AL  3,412,187

METHOD FOR FORMING PLASTIC ARTICLES

Original Filed Dec. 4, 1962  3 Sheets-Sheet 3

INVENTORS
CLEMENT V. FOGELBERG
RICHARD H. CRAWFORD
DONALD E. OBERBECK
BY
ATTORNEY

United States Patent Office 3,412,187
Patented Nov. 19, 1968

1

3,412,187
METHOD FOR FORMING PLASTIC ARTICLES
Clement V. Fogelberg, Richard H. Crawford, and Donald E. Oberbeck, Boulder, Colo., assignors, by mesne assignments, to Ball Brothers Company, Muncie, Ind., a corporation of Indiana
Continuation of application Ser. No. 554,214, May 31, 1966, which is a continuation of application Ser. No. 242,213, Dec. 4, 1962. This application Feb. 16, 1967, Ser. No. 616,731
12 Claims. (Cl. 264—89)

ABSTRACT OF THE DISCLOSURE

A process for forming plastic articles wherein expandable plastic tubing is placed in a mold of the desired configuration and expanded into conformity with the mold. Fluid is initially introduced into the tubing at a pressure sufficient to partially expand at least a portion of the tubing adjacent to the end or neck-forming portion of the mold so that said portion of said tubing contacts the mold to at least partially form that portion of the article, and the applied fluid pressure is thereafter increased to expand the tubing into final configuration in the mold. Pressure is also exerted by press molding to complete formation of a neck portion of the article.

---

This application is a continuation of copending U.S. application Ser. 554,214, filed May 31, 1966, entitled "Forming Plastic Articles" by Clement V. Fogelberg et al., which application was a continuation of application Ser. No. 242,213, filed Dec. 4, 1962, entitled "Forming Plastic Articles" by Clement V. Fogelberg et al. and both now abandoned.

The present invention relates generally to the forming of plastic articles, and more particularly to the forming of hollow plastic articles such as containers or bottles.

One of the major problems encountered in manufacturing plastic containers and bottles is the formation of thread and cap sealing portions on the containers with such a degree of accuracy that secondary finishing operations are not required.

In the past, efforts to solve this problem have involved the use of complicated mechanical devices. For example, it has been proposed to initially injection mold the neck portion of a container by forcing or injecting hot moldable plastic between a movable hollow mandrel and a neck mold section, drawing the mandrel and neck mold away from the plastic injector to form a connecting tube, surrounding the tube with a mold, and then inflating the tube to the contour of the mold by passing air through the mandrel. Such a method obviously requires careful synchronization of the movement of the mandrel with the action of the injector and does not make possible the use of continuous extrusion which is necessary for a high production operation.

Other methods used in the past involved extruding a tube of plastic about a mandrel, and then press-molding the threaded portion of the container neck about the mandrel and blow-molding the remainder of the container. This method also was not entirely satisfactory since the press molding, between a pair of movable mold sections, many times resulted in a plastic seam being formed which required subsequent finishing.

By gripping the parison initially only at one end and subjecting it initially to a partial low pressure blowing stage, the instant invention overcomes another problem experienced in the past. Previously manufacturers have applied high pressure air directly to the plastic tube, but often this caused the plastic article to have an uneven distribution of material in the walls because of local expansion occurring at one end and a resulting chilling of portions only of the tube wall. Furthermore, the high pressure air, suddenly applied, would cause the plastic tube to become unseated at the end, or ends, due to the creation of longitudinal tension toward the center of the tube when the middle portion of the tube expanded.

The utilization of two blowing stages in the instant invention as described above avoids these problems. The low pressure stage serves to seat the free end of the plastic tube in the finished area of the mold, and furthermore expands the tube halfway without pulling the ends in toward the middle and yet creates a cavity for the second stage of high pressure air to blow into, the walls now being far enough away from the fluid jet and the cavity now being sufficiently spacious to avoid local expansion at one end and the attendant uneven material distribution in the walls of the produced article.

It is, therefore, an object of the present invention to provide an improved method for forming hollow plastic articles.

Another object of the invention is to provide an improved method of forming hollow plastic articles with threaded portions formed thereon.

A still further object of the invention is to provide a method of forming such articles in which no secondary finishing operations are required.

Other objects and advantages of the invention will become apparent from the following detailed description of a preferred embodiment thereof, reference being had to the accompanying drawings, in which:

FIGURE 1 is a sectional elevation view of apparatus for producing and handling the plastic tubing;

FIGURE 2 is a sectional elevation view of the apparatus illustrated in FIGURE 1, ready for transfer of the tube segment;

FIGURE 3 is a sectional elevation view of one type of apparatus capable of carrying out aplicants' method;

FIGURES 4 to 8 are partial sectional elevation views of the apparatus shown in FIGURE 3, illustrating the various stages of applicants' method;

Figure 9:
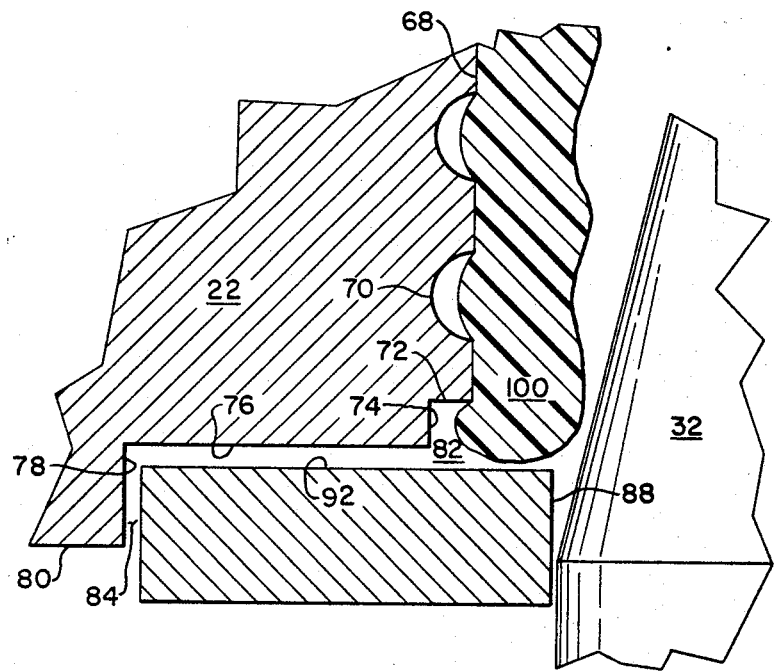
FIGURE 9 is an enlarged partial sectional elevation of the closure and forming mechanism for the sealing face of the container.

With reference now to FIGURE 1 of the drawings, there is shown an extrusion nozzle 10 or head having an annular outlet orifice 12 through which a hot, or otherwise plasticized organic plastic material, for example polyethylene, is extruded as a seamless tube 14. The nozzle 10 may be of the type well known to the art and may be of the type shown in U.S. Patents 2,349,176 and 2,787,023 issued respectively May 16, 1944 and Apr. 2, 1957.

As shown in FIGURE 2, after a section of tubing 14 of the desired length, in any event longer than the final container, has been extruded, it may be grasped immediately below the orifice 12 by tongs 16, after which a knife blade 18 is traversed across the bottom of the nozzle 10 to detach the tubing section 20. If desired, the tubing section first may be cut and simultaneously grasped at the upper end by the tongs.

Regardless of the method used to sever and convey the tubing section 20, the section or parison is located as shown in FIGURE 3, between a pair of open movable, mating mold sections 22, 24 and has its lower end edge preferably spaced vertically apart from, but immediately adjacent to, a vertically movable centering ring 26 which, as will latter be described, constitutes a molding surface and is supported by means of member 28. Suitable means such as cylinders 30 are provided to move the mold section 22, 24 from the open to the closed position. By this movement into the closed position, the tubing section is firmly pressed together, pinched and sealed at its uppermost extremity, but immediately below the tongs, by the upper mating surfaces of the mold halves 22 and 24, resulting in a hollow tube with only one open end.

Positioned below the ring 26 and in axial alignment therewith is a blow nozzle 32 having a tapered entry portion 34 and a body portion 36. Spaced downwardly from the upper end of the body portion is an annular shoulder 38 which, as will be later described, moves the ring 26 into final molding position. The enlarged portion 40 of blow nozzle 32 may be slidably mounted within a bearing 42 and actuated by means of a cylinder 44 having its piston rod 46 secured to the nozzle body portion 40. Suitable air lines 48 and 50 provided with hand valves 52, 54 supply the cylinder.

An air passage 56 is provided in the nozzle entry and body portions and preferably terminates in a plurality of orifices 58 in the nozzle entry portion 34 and in an axial orifice 60 provided in the tip extremity of the entry portion. Preferably, the orifices in the tapered entry portion 34 are evenly spaced about the periphery thereof and located in a plurality of rings spaced along the length of the tapered portion. At its lower end, the air passage 56 terminates at a suitable fitting 62 having connected thereto a pressure line 64 provided with a hand valve 66 and connected to a source of fluid under pressure, such as compressed air.

As shown in FIGURES 4 to 9, the mold sections 22, 24 each include a substantially straight neck facing surface 68 provided with grooves 70 for forming threads on the neck of the plastic container to be formed. At its lowermost end the surface 68 has a notch formed therein defined by lateral surface 72 and depending surface 74. Depending surface 74 has its lower end terminating at lateral surface 76 which, in turn, terminates at depending surface 78 which meets the outer mold surface 80. Thus, when closed, the mold sections 22 and 24 define a first annular ring 82 which, as will later be described, forms the sealing face of the container, and a second outermost annular ring 84 which receives the ring 26. It will be understood that applicants' novel method is not limited to use with a mold of the above type and that such mold is only one of many types that may be used.

Figure 10:
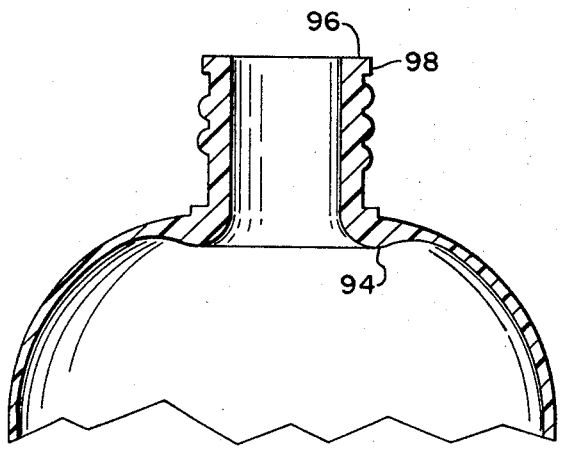
FIGURE 10 is a sectional front elevation partial view of a typical bottle produced by applicants' method and apparatus.

As shown in FIGURE 4 the O.D. of the tubing section 20 is preferably such that when the mold sections 22, 24 are closed there is normally a small space between the outer tube wall 86 and the mold surface 68, and the inner surface 88 of the ring 26 is spaced outwardly from the inner wall 90 of the tubing section 20. Preferably, the upper surface 92 of the ring 26 is also spaced downwardly a slight distance from the mold surface 76 so that the end edge of the tubing section 20 is also spaced downwardly from the surface 76. As will be later described, this is important when forming a bottle of the type shown in FIGURE 10 which is provided with a pouring lip 98.

After the lower end edge of the tubing section 20 is positioned above and immediately adjacent to the ring 26, and normally immediately after the mold sections are closed, although it may occur before, the blow stick is moved from the position shown in FIGURE 3 to the initial blowing position of FIGURE 4 by admitting air to the cylinder through line 50. In the position of FIGURE 5, it will be noted that the orifices 58 about the periphery of the tapered nozzle section 34 are opposite the grooved or threaded mold neck portions 70. While the nozzle is being moved to the position shown in FIGURE 5 or immediately after reaching this position, fluid under pressure, preferably air at a temperature less than that of the tubing section 20 is emitted from the orifices 58 and 60 to initially expand the tubing and initially force portions of the tubing into the threads 70 of the mold neck portion due to the radial pressure exerted upon the tubing by fluid emitted from the orifices 58. It will be noted that with the blow stick in the position of FIGURE 5 the interior of the tubing is exposed to the atmosphere and the air, initially introduced inwardly of the end of the tubing, can circulate within the tubing and escape outwardly between the portion 34 of the nozzle and the inner surface 88 of the ring 26. Thus initial expansion of the tubing by the circulating cooling air also has a chilling effect on the innermost segment of the inner wall 90 of the tubing.

The pressure of the fluid or air initially emitted from the blow stick may vary, depending upon the temperature and thickness of the tubing at the time of initial blowing. However, it is important that the pressure not be to high since over-expansion of the portion of the tubing beyond the neck portion may draw the lowermost end of the tubing inwardly from the mold neck portion since at the time of initial blowing the lower end of the tubing is not restrained. However, if the pressure is not great enough the plastic will not be initially forced into the threaded mold portion and thus the neck portion of the tube will not be anchored against the expansion of the upper tube portion. In this latter regard it is also important that the initial blowing extend over a relatively short time so direct contact of the plastic with the air will not unduly chill the plastic thus preventing the plastic from intimately conforming to the configuration of the mold neck section at a subsequent step in the process. Thus the time interval of initial blowing, as well as the amount of pressure used, are both important and will depend upon the type of plastic used in the tubing, as well as the temperature of both the tubing and the blowing fluid. Entirely satisfactory results have been obtained using polyethylene tubing having a wall thickness of about .25 inch, a temperature at time of blowing of about 380° F. to 450° F., and when using initial air pressure building up almost instantaneously from 0 to 5 p.s.i. to about 25 or 30 p.s.i. or even up to 50 p.s.i. The application of this pressure is effected by hand manipulation of the valve 66 in the pressure line 64.

After initial blowing is effected, the plastic tubing is in the condition shown in FIGURE 6 where it will be noted that the shoulder portions 94 of the container are substantially formed so that an increase in air pressure will primarily cause lateral movement of the main body of the plastic and will not draw the tubing out of the mold neck portion. Thus it is now safe to apply sufficient air pressure to the interior of the tubing to effect final molding which preferably is at a pressure in the order of 100 to 150 p.s.i., although this pressure will depend upon the mold contour. Preferably the desirable full air pressure is applied before the blow stick is moved to the position of FIGURE 6 and before the periphery of the blow stick fully contacts and seals the interior of the tubing section, as shown in FIGURE 6. However, satisfactory results are obtained when the full air pressure is applied after the blow stick has moved to the position of FIGURE 6 and after the interior of the tubing section has been contacted and sealed by the blow stick.

As the blow stick moves from the position of FIGURE 5 to that of FIGURE 6, the outer surface of the lower portion of the tubing is forced progressively, from the lowermost extremity proceeding upwardly, into the threaded portions of the mold by the base of the tapered portion 34 and the body portion 36 while excess material, i.e., that in excess of the amount required to fill the space between the mold neck and the body 36 of the blow stick, is forced inwardly ahead of the body portion 36 of the blow stick and collects at the shoulder of the mold where, due to the pressure within the tubing, it is forced or spread radially outwardly to form the thickened shoulder portion 94 shown in FIGURES 6 to 8.

When the body of the blow stick has substantially or completely traversed the neck portion of the mold, the end or sealing face 96 of the container is formed by applying pressure to the end edge of the tubing in a direction normal to the longitudinal axis of the tubing and substantially normal to the end edge while simultaneously confining and chilling the lower portion and the end edge of the tubing. As shown in FIGURE 6 the plastic does not completely fill the area defined by the ring surface 92 and the mold surfaces 72 and 74. This is due to the fact that some material comprising the lower portion of the tubing is lifted upwardly by the tapered segment of the blow stick and thus insufficient material is initially available to fill the annular ring 82 defined by the mold surfaces 72 and 74. This is desirable, however, since it enables accurate finishing of the sealing face of the container which is effected by the shoulder 38 of the blow stick engaging the undersurface of the ring 26 and seating the upper surface of the ring against the mold surface 76 thus compressing the end segment 100 of the tubing into the area defined by the annular mold ring 84 and the surface 92 of the ring. At the same time, contact of the inner periphery of the neck portion of the tube with inwardly advancing areas of the blow stick simultaneously chills the plastic as it is being compressed. Of course, the chilling of the plastic in other portions of the neck of the mold also takes place simultaneously with the compressing and die pressing of the plastic therein since the blow stick is relatively cooler and thus contact cools the plastic. This is advantageous in that it advances the cooling of the container neck portion which is the most critical area because of the threads and thus shortens the cooling cycle within the mold.

Depending upon the temperature of the tubing and the magnitude of the final blowing pressure, the blow stick is maintained in the position of FIGURE 7 for a period of between about 5 to 30 seconds after which it is withdrawn while maintaining the flow of fluid. As the upper extremity of the blow stick body portion 36 clears the lower extremity 102 of the tubing neck, air is permitted to escape, thus beginning the cooling of the now-formed plastic article before the blow stick is completely withdrawn from the interior. This is advantageous in that it shortens the molding cycle by utilizing the blowing fluid as a cooling medium.

From the foregoing description of the invention, it will be readily apparent that the method and apparatus of the instant invention give rise to advantages not heretofore attained by the prior art processes and apparatus. Thus the method of the invention enables the forming of a plastic container in which no subsequent finish treatment is required for the threaded or cap sealing portions. Since all areas of the container neck are engaged by molding surfaces, the use of the moving blow stick or mandrel also provides for accurate control and sizing of the internal diameter of the neck of the container. By continuing the application of blowing fluid during the withdrawal of the blow stick a substantial quantity of fluid is passed through the container and out the neck portion thereof, resulting in a flow of air past the interior portions of the container which cool the slowest because of their greater mass. Therefore, it can clearly be seen that the method of the invention enables sequential cooling; first, by convection during the first stage of blowing as the pressure fluid circulates through the tubing section and passes out of the open end through the space between the inner wall of the tubing and the blow stick; second, by conduction as the mold surfaces contact the entire outer surface of the blown article and the blow stick contacts the inner surface of the lower portion of the tube opposite the threads which have been formed in the neck of the article; third, by convection as the blow stick withdraws allowing the high pressure fluid to circulate through the article and pass out the finished neck portion, which is now open. Sufficient cooling of this portion of the container is quite important since one major cause of rejects is due to the neck of the container being at an angle to the body portion which is caused by inadequate cooling of the container in the neck and shoulder portions.

While there has been disclosed the preferred embodiment of the method and apparatus of the invention, it is apparent that various changes and modifications may be made without departing from the intent and scope of the invention as defined in the appended claims.

What is claimed is:

1. A method of forming a hollow plastic article by blow molding wherein expandable plastic tubing is placed in a mold having an end portion and a body-forming portion and expanded into conformity with the mold, said method comprising initially introducing fluid internally of said tubing through said end portion and at a pressure sufficient to partially expand at least a portion of said tubing adjacent to said end portion within said mold so that said portion of said tubing contacts said mold to at least partially form the end portion of the article to thereafter hold the tubing in position, and thereafter increasing the applied fluid pressure to expand said tubing into final article configuration in said mold.

2. A method of forming a hollow plastic article by blow molding wherein expandable plastic tubing is placed in a mold having a neck-forming portion and a body-forming portion and expanded into conformity with the mold, said method comprising initially introducing fluid internally of said tubing at a pressure sufficient to partially expand at least a portion of said tubing adjacent to said neck-forming portion within said mold so that said portion of said tubing contacts said mold to at least partially form the neck portion of the article to thereafter hold said tubing in position, and thereafter increasing the applied fluid pressure to expand said tubing into final article configuration in said mold.

3. A method of forming a hollow plastic article by blow molding wherein expandable plastic tubing is placed in a mold of the desired configuration and expanded into conformity with the mold so that said article has a neck portion of non-uniform exterior contour and a body portion, said method comprising: introducing fluid under pressure into the interior of the tubing to initially project the plastic tubing into the neck-forming portion of the mold to at least partially form the non-uniform exterior contour of said article; and exerting pressure on the interior of the neck portion of the tubing independently of said fluid under pressure while continuing to supply said fluid under pressure to the interior of the tubing to expand the article to final configuration.

4. The method of claim 3 wherein said fluid supplied to the interior of said tubing while pressure is exerted on the interior of the neck portion of the tubing is supplied at an increased pressure relative to the fluid initially introduced to project the tubing into the neck-forming portion of the mold.

5. The method of claim 3 wherein said pressure exerted on the neck portion of said tubing is exerted by press molding and tubing along the length of the neck portion after said tubing has been projected into the neck-forming portion of the mold by the initial introduction of fluid under pressure.

6. The method of claim 5 wherein said press molding of the tubing is accomplished by progressively die pressing the tubing into the neck-forming portion of the mold along the length thereof after said tubing has been projected into the neck-forming portion of the mold by the initial introduction of fluid under pressure.

7. A method of forming a hollow plastic article by blow molding wherein expandable plastic tubing is placed in a mold of the desired configuration and expanded into conformity with the mold so that said article has a neck portion of non-uniform exterior contour and a body portion, said method comprising: introducing fluid internally of said tubing at a fluid pressure sufficient to initially force said tubing against the neck-forming portion of the mold to at least partially form the non-uniform exterior contour of the neck portion of the article; exerting pressure on the interior of the tubing independently of said fluid pressure to complete formation of the neck portion of the article; and increasing said fluid pressure to expand the remainder of the tubing to complete formation of the body portion of the article.

8. The method of claim 7 wherein said plastic tubing has an open end, wherein said fluid first introduced to the interior of said tubing is introduced while maintaining the tubing open to the atmosphere, and wherein said tubing is closed to the atmosphere when said pressure is exerted to complete formation of the neck portion of the article.

9. The method of claim 8 wherein said tubing is reopened after completion of formation of said body portion of the article, and wherein the application of fluid under pressure within the article is continued to thereby cause said fluid to circulate through the interior of the article.

10. A method of forming a hollow plastic article having a threaded neck portion, comprising supporting a length of plastic tubing within a mold having the desired contour, said tubing having an open end positioned within the confines of a threaded neck portion of the mold and said tubing being in a condition of plasticity such as to permit expansion to a predetermined form, introducing fluid under pressure into the interior of the tubing inwardly of the open end thereof to initially project the plastic tubing into the threaded end portion, and completing formation of the neck of the article by press molding the plastic into the mold threads along the length of the mold neck portion while continuing to supply fluid under pressure to the interior of the tubing.

11. A method of forming a hollow plastic article having a threaded neck portion, comprising supporting a length of plastic tubing within a mold having the desired contour, said tubing having an open end positioned within the confines of a threaded neck portion of the mold and said tubing being in a condition of plasticity such as to permit expansion to a predetermined form, introducing fluid under pressure into the interior of the tubing inwardly of the open end thereof to initially project the plastic tubing into the threaded end portion, and progressively die pressing the plastic into the mold threads along the length of the mold neck portion while continuing to supply fluid under pressure to the interior of the tubing.

12. A method of forming a hollow plastic container having a threaded neck portion and a body portion of larger circumference than said neck portion, comprising supporting a length of plastic tubing within a mold having a threaded neck and enlarged body portion, said tubing having a closed end portion and an open end portion the latter being positioned within the confines of the mold neck portion and said tubing being in a condition of plasticity such as to permit expansion to a predetermined form, introducing fluid internally of said tubing at a pressure sufficient to initially force said tubing into the threaded mold portions while maintaining the interior of the tubing open to the atmosphere, and exerting pressure on the interior of the tubing independently of the fluid pressure to force the plastic into the threaded mold neck while closing the interior of the tube to the atmosphere and increasing the fluid pressure to expand the remainder of the tubing into final contact with the mold.

References Cited

UNITED STATES PATENTS

| | | | |
|---|---|---|---|
| 3,009,196 | 11/1961 | Hagen | 264—98 |
| 3,012,286 | 12/1961 | Gasmire | 264—97 |
| 3,084,395 | 4/1963 | Thielfoldt | 264—98 |
| 3,164,646 | 1/1965 | Fischer | 18—5 X |

ROBERT F. WHITE, *Primary Examiner.*

A. R. NOE, *Assistant Examiner.*